Patented Jan. 1, 1952

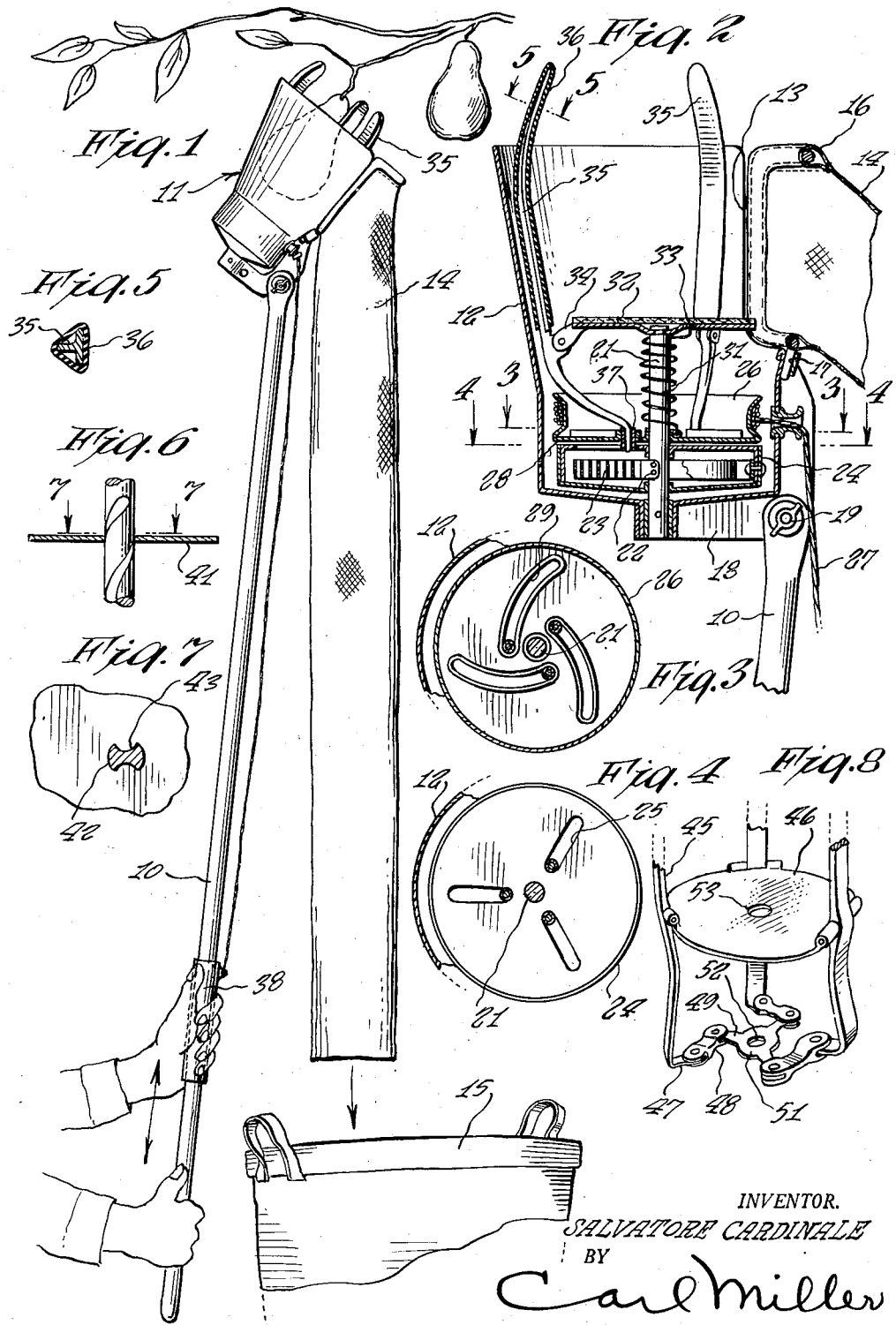

2,581,236

UNITED STATES PATENT OFFICE 2,581,236

POLE SUPPORTED FRUIT GATHERER

Salvatore Cardinale, Freeport, N. Y.

Application October 22, 1949, Serial No. 123,068

1 Claim. (Cl. 56—334)

This invention relates to a fruit picking device.

It is an object of the present invention to provide a fruit picking device which is automatic in its gripping action upon the fruit, the parts engaging with the fruit being spring pressed toward a closed position on the fruit and adapted to be opened by mechanical action against the action of the springs and whereby the grip upon the fruit can be controlled and without great pressure and only by the pressure as measured by the springs.

Other objects of the present invention are to provide a spring pressed fruit picking device which is of simple construction, inexpensive to manufacture, easy to manipulate, has a minimum number of parts, and efficient in operation.

For other objects and for a better understanding of the invention, reference may be had to the following detailed description taken in connection with the accompanying drawing, in which Fig. 1 is a side elevational view of the picker being applied to the fruit tree to engage with the fruit thereof.

Fig. 2 is an enlarged vertical sectional view of the engaging end of the picker.

Figs. 3 and 4 are respectively horizontal sectional views taken respectively on lines 3—3 and 4—4 of Fig. 2.

Fig. 5 is a detail sectional view taken through one of the picking prongs, there being three such prongs.

Fig. 6 is a vertical sectional view of a modified form of the invention.

Fig. 7 is a horizontal sectional view taken generally on line 7—7 of Fig. 6.

Fig. 8 is a fragmentary perspective view of a still further form of the invention utilizing still a different means for operating the picker fingers.

Referring now particularly to Figs. 1 to 4, 10 represents a pole to the upper end of which there is connected picker mechanism 11. This mechanism comprises a cup-shaped housing 12 open at its upper end to receive fruit when the mechanism is elevated by the pole 10 beneath the fruit. This housing is open at the side, as indicated at 13, and has connected to the same a long flexible tube 14 through which the fruit is dispensed and delivered to a basket 15 which is supported therebelow. The tube 14 is connected to a special frame or wire 16 at its upper end and this wire can be fitted into a slot 17 and can be easily and readily removed.

Fixed to the bottom 18 of the housing 12, to which the upper end of pole 10 is adjustably connected by a clamping bolt means, as indicated at 19, is a vertically extending shaft 21. Anchored as indicated at 22 is a flat concentric coil spring 23 and to the upright member 21. The other end of this spring is fixed to a casing 24 journalled on the upright member or shaft 21. The upper end of this casing has radially extending elongated slots 25, Fig. 4. Above the housing member 24 there is journalled a wheel 26 about which pull cord 27 extends. This wheel has a bottom face 28 with arcuate elongated slots 29 therein. The cable cord 27 is maintained in a wound position upon the wheel 26 by a coil spring 31 surrounding the shaft 21.

Fixed upon the upper end of the shaft 21 is a plate 32 onto which the fruit piece is dropped. The coil spring 31 is anchored to the plate 32 as indicated at 33. This spring 31 will tend to keep the cord 27 wound upon the wheel 26.

Upon the plate 32 are a plurality of circumferentially spaced brackets 34, three in number, which will support respectively three upwardly extending picker element fingers or prongs 35 which are covered with a soft material such as rubber and as indicated at 36. These fingers have lower projections which extend downwardly and inwardly and have rollers 37 disposed respectively thereupon. These rollers extend through the arcuate slots 29 of the wheel 26 and enter the elongated radial slots 25 of the member 24. As the cord 27 is pulled, the lower ends of the fingers 35 will move outwardly so as to pivot inwardly the upper ends of the fingers about the fruit piece in the manner as shown in Fig. 1. These fingers will be caused to move outwardly because of the arcuate shape of the slots 29 in the wheel 26 acting upon the rollers 37. The springs 23 and 31 will then return the lower ends of the fingers 35 to their inner positions upon the cord being released. The lower end of the cord 26 is connected to a sleeve slide 38 which is easily operated upon the pole piece 10. The fingers 35 are returned to their retracted positions under the actions of the springs. The fingers can be rotated within the housing 27 by a continued pull of the cord, the plate 22 being rotatable upon the shaft 21. This rotation, however, of the fingers is against the action of the flat concentric spring 23. The pull and the engagement of the fingers with the fruit is always through the spring 23 as the member 24 is biased for rotation upon the shaft 21 by this spring 23.

In Figs. 6 and 7, there is shown a modified construction wherein rotation of plate 41 for operating the picking elements or prongs may result from downward movement of the plate over a grooved shaft 42 having spiral grooves 43 therein.

In Fig. 8, there is shown a further modification of the invention wherein picking elements 45 thereof are hinged upon a plate 46 and their lower ends are inwardly bent, as indicated at 47, for engagement with links 48 connected to radially extending arms 49 of an actuating plate 51. As the plate 51 is rotated, the links 48 will be straightened and the picking elements will be pivoted inwardly at their upper ends to engage the fruit. A spring biased wheel can be connected to the plate 51 to rotate the same upon a shaft which may extend upwardly through an opening 52 in the plate and also an opening 53 in the plate 46.

While various changes may be made in the detail contruction, it shall be understood that such changes shall be within the spirit and scope of the present invention as defined by the appended claim.

Having thus set forth and disclosed the nature of my invention, what is claimed is:

In a fruit picking device, a pole, a fruit receiving housing open at its upper end, means for connecting said housing to the upper end of said pole, a shaft fixed to the bottom of the housing and extending upwardly therefrom, a casing journalled upon said shaft adjacent the bottom of said housing and having radially extending slots, a concentric coil spring, one end of said spring being secured to said shaft and the other end thereof being secured to said casing, a wheel journalled on said shaft above said casing, a cord wound on said wheel, means disposed on said pole for securing one end of said cord and movable along the said pole in axial direction, thereby pulling the said cord and unwinding the same from the said wheel, said wheel having radially extending arcuate slots therein, a fruit receiving plate secured to the upper end of the said shaft, a helical spring surrounding said shaft above the wheel, one end of said helical spring being connected to said wheel and its other end to the said plate, picker elements pivoted upon the plate for inward and outward movement, said picker elements having lower projections extending through said arcuate slots of said wheel into said radially disposed slots of said casing, so that upon pulling of the cord the said wheel and said casing are rotated thereby forcing the lower projections of said picker elements outwardly, the latter to be returned to their original position by means of said spiral and helical springs upon releasing said cord.

SALVATORE CARDINALE.

REFERENCES CITED

The following references are of record in the file of this patent:

UNITED STATES PATENTS

| Number | Name | Date |
|---|---|---|
| 57,106 | Evans | Aug. 14, 1866 |
| 442,923 | Walker | Dec. 16, 1890 |
| 1,166,066 | Lucas | Dec. 28, 1915 |